US012380898B2

(12) United States Patent
McGrath

(10) Patent No.: US 12,380,898 B2
(45) Date of Patent: Aug. 5, 2025

(54) ENCODING OF MULTI-CHANNEL AUDIO SIGNALS COMPRISING DOWNMIXING OF A PRIMARY AND TWO OR MORE SCALED NON-PRIMARY INPUT CHANNELS

(71) Applicant: Dolby Laboratories Licensing Corporation, San Francisco, CA (US)

(72) Inventor: David S. McGrath, New South Wales (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 127 days.

(21) Appl. No.: 18/000,841

(22) PCT Filed: Jun. 10, 2021

(86) PCT No.: PCT/US2021/036789
§ 371 (c)(1),
(2) Date: Dec. 6, 2022

(87) PCT Pub. No.: WO2021/252748
PCT Pub. Date: Dec. 16, 2021

(65) Prior Publication Data

US 2023/0215444 A1 Jul. 6, 2023

Related U.S. Application Data

(60) Provisional application No. 63/037,635, filed on Jun. 11, 2020, provisional application No. 63/193,926, filed on May 27, 2021.

(51) Int. Cl.
*G10L 19/008* (2013.01)
*G10L 19/002* (2013.01)
*G10L 19/02* (2013.01)

(52) U.S. Cl.
CPC .......... *G10L 19/008* (2013.01); *G10L 19/002* (2013.01); *G10L 19/0204* (2013.01)

(58) Field of Classification Search
CPC .................................................... G10L 19/008
See application file for complete search history.

(56) References Cited

U.S. PATENT DOCUMENTS 8,340,325 B2 12/2012 Oh
8,538,766 B2 9/2013 Hellmuth
(Continued)

FOREIGN PATENT DOCUMENTS

CN 105723453 A 11/2019
CN 110544484 B 12/2021
(Continued)

OTHER PUBLICATIONS

Mahe Pierre, et al "First-Order Ambisonic Coding with PCA Matrixing and Quaternion-Based Interpolation", Proceedings of the 22 nd International Conference on Digital Audio Effects, Sep. 2, 2019 (Sep. 2, 2019), pp. 1-8, XP055835009.
(Continued)

*Primary Examiner* — Bryan S Blankenagel

(57) ABSTRACT

Systems, methods, and computer program products are disclosed for adaptive downmixing of audio signals with improved continuity. An audio encoding system receives an input multi-channel audio signal including a primary input audio channel and L non-primary input audio channels. The system determines a set of L input gains. For each of the channels and gains, the system forms a respective scaled non-primary input audio channel. The system forms a primary output audio channel from the sum of the primary input audio channel and the scaled non-primary input audio channels. The system determines a set of L prediction gains. The system forms a prediction channel from the primary output audio channel. The system forms L non-primary
(Continued)

output audio channels. The system forms an output multi-channel audio signal from the primary output audio channel and the L non-primary output audio channels.

2 Claims, 5 Drawing Sheets

(56) References Cited

U.S. PATENT DOCUMENTS

| | | | | |
|---|---|---|---|---|
| 8,817,991 | B2 | 8/2014 | Jaillet | |
| 9,129,593 | B2 | 9/2015 | Ojala | |
| 9,514,759 | B2 | 12/2016 | Virette | |
| 9,584,235 | B2 | 2/2017 | Ojala | |
| 9,875,746 | B2 | 1/2018 | Honma | |
| 2007/0033056 | A1 | 2/2007 | Herre | |
| 2008/0192941 | A1 | 8/2008 | Oh | |
| 2016/0241982 | A1 * | 8/2016 | Seefeldt | H04S 5/005 |
| 2016/0247507 | A1 | 8/2016 | Disch | |
| 2018/0122384 | A1 * | 5/2018 | Melkote | G10L 19/0017 |
| 2019/0259398 | A1 | 8/2019 | Buethe | |
| 2020/0152209 | A1 | 5/2020 | Büthe | |
| 2022/0122619 | A1 * | 4/2022 | Shlomot | G10L 19/008 |

FOREIGN PATENT DOCUMENTS

| | | | |
|---|---|---|---|
| EA | 035064 | B1 | 4/2020 |
| JP | H0870252 | A | 3/1996 |
| RU | 2609097 | C2 | 1/2017 |
| TW | 201214416 | A | 4/2012 |
| TW | 201830379 | A | 8/2018 |
| WO | 2007009548 | A1 | 1/2007 |
| WO | 2016001357 | A1 | 1/2016 |
| WO | 2020010072 | A1 | 1/2020 |
| WO | 2021022087 | A1 | 2/2021 |

OTHER PUBLICATIONS

McGrath D et al: Immersive Audio Coding for Virtual Reality Using a Metadata-assisted Extension of the 3GPP EVS Codec11 , ICASSP 2019—2019 IEEE International Conference on Acoustics, Speech and Signal Processing (ICASSP), IEEE, May 12, 2019 (May 12, 2019), pp. 730-734, XP033566263.

Text of ISO/IEC 23008-3:201x 3D Audio, Second Edition11 , 117. MPEG Meeting; Jan. 16, 2017-Jan. 20, 2017; Geneva; (Motion Picture Expert Group or ISO/IEC JTC1/SC29/WG11), Mar. 9, 2017. • No. n16582.

Wu, B. et al "Downmix and Coding of Multichannel Signals Based on Spatial Correlation" IEEE 2015 8th International Congress on Image and Signal Processing (CISP 2015) pp. 1142-1146.

Choi et al., "Multi-Channel Audio CODEC with Channel Interface Suppression," Journal of Semiconductor Technology and Science, vol. 15, No. 6, Dec. 30, 2015, pp. 1-7, 7 pages.

* cited by examiner

ENCODING OF MULTI-CHANNEL AUDIO SIGNALS COMPRISING DOWNMIXING OF A PRIMARY AND TWO OR MORE SCALED NON-PRIMARY INPUT CHANNELS

CROSS-REFERENCE TO RELATED APPLICATIONS

This application is a U.S. National Stage of International Application No. PCT/US2021/036789, filed Jun. 10, 2021, which claims priority to U.S. Provisional Patent Application No. 63/037,635, filed Jun. 11, 2020, and U.S. Provisional Patent Application No. 63/193,926, filed May 27, 2021, each of which is hereby incorporated by reference in its entirety.

TECHNICAL FIELD

This disclosure relates generally to audio coding, and in particular to coding of multi-channel audio signals.

BACKGROUND

When an input audio signal is to be stored or transmitted for later use (e.g., to be played back to a listener) it is often desirable to encode the audio signal with a reduced amount of data. The process of data reduction, as applied to an input audio signal, is commonly referred to as “audio encoding” (or “encoding”), and the apparatus used for encoding is commonly referred to an “audio encoder” (or “encoder”). The process of regeneration of an output audio signal from the reduced data is commonly referred to as “audio decoding” (or “decoding”), and the apparatus used for the decoding is commonly referred to as an “audio decoder” (or “decoder”). Audio encoders and decoders may be adapted to operate on input signals that are composed of a single audio channel or multiple audio channels. When an input signal is composed of multiple audio channels, the audio encoder and audio decoder is referred to as a multi-channel audio encoder and a multi-channel audio decoder, respectively.

SUMMARY

Implementations are disclosed for adaptive downmixing of audio signals with improved continuity.

In some embodiments, an audio encoding method comprises: receiving, with at least one processor, an input multi-channel audio signal comprising a primary input audio channel and L non-primary input audio channels; determining, with the at least one processor, a set of L input gains, where L is a positive integer greater than one; for each of the L non-primary input audio channels and L input gains, forming a respective scaled non-primary input audio channel from the respective non-primary input audio channel scaled according to the input gain; forming a primary output audio channel from the sum of the primary input audio channel and the scaled non-primary input audio channels; determining, with the at least one processor, a set of L prediction gains: for each of the L prediction gains, forming, with the at least one processor, a prediction channel from the primary output audio channel scaled according to the prediction gain; forming, with the at least one processor, L non-primary output audio channels from the difference of the respective non-primary input audio channel and the respective prediction signal; forming, with the at least one processor, an output multi-channel audio signal from the primary output audio channel and the L non-primary output audio channels; encoding, with an audio encoder, the output multi-channel audio signal; and transmitting or storing, with the at least one processor, the encoded output multi-channel audio signal.

In some embodiments, wherein determining the set of L input gains, comprises: determining a set of L mixing coefficients; determining an input mixture strength coefficient; and determining the L input gains by scaling the L mixing coefficients by the input mixture strength coefficient.

In some embodiments, determining the set of L prediction gains, comprises: determining a set of L mixing coefficients; determining a prediction mixture strength coefficient; and determining the L prediction gains by scaling the L mixing coefficients by the prediction mixture strength coefficient.

In some embodiments, the input mixture strength coefficient, h, is determined by a pre-prediction constraint equation, h=fg, where f is a pre-determined constant value greater than zero and less than or equal to one, and g is the prediction mixture strength coefficient.

In some embodiments, the prediction mixture strength coefficient, g, is a largest real value solution to:

$$Bf^2g^3 + 2\alpha fg^2 - \beta fg - \alpha + gw = 0,$$

$$\text{where } \beta = u^H \times E \times u,\ u = \frac{1}{\alpha}v,\ \alpha = |v|_2 = \sqrt{\sum\nolimits_{n=1}^{N} v_n^2},$$

quantity w, column vector v and matrix E are components of a covariance matrix for an intermediate signal that has a dominant channel.

In some embodiments, the covariance matrix of the intermediate signal is computed from a covariance matrix of the multi-channel input audio signal.

In some embodiments, two or more input multi-channel audio channels are processed according to a mixing matrix to produce the primary input audio channel and the L non-primary input audio channels.

In some embodiments, the primary input audio channel is determined by a dominant eigen-vector of an expected covariance of a typical input multi-channel audio signal.

In some embodiments, each of the L mixing coefficients are determined based on a correlation of a respective one of the non-primary input audio channels and the primary input audio channel.

In some embodiments, the encoding includes allocating more bits to the primary output audio channel than to the L non-primary output audio channels, or discarding one or more of the L non-primary output audio channels.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. An input multi-channel audio signal is processed by an audio encoder pre-mixer to form an output multi-channel audio signal that has two desirable attributes for efficient encoding. The first attribute is that at least one dominant audio channel of the output multi-channel audio signal contains most or all of the sonic elements of the input multi-channel audio signal. The second attribute is that each of the audio channels of the output multi-channel audio signal are largely uncorrelated to each of the other audio channels. The simple encoder may provide data to a simple decoder to assist in the regeneration of audio channels that were discarded by the simple encoder.

The two attributes described above allow the output multi-channel audio signal to be efficiently encoded by a simple encoder by allocating fewer bits to the encoding of less dominant channels or choosing to discard less dominant audio channels entirely.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

Figure 1:
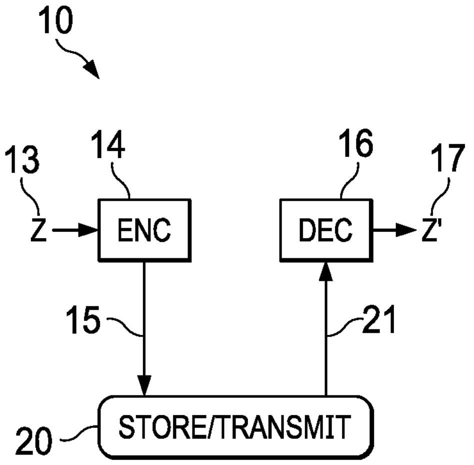
FIG. 1 is a block diagram of an arrangement of a simple audio encoder and simple audio decoder intended to form an output multi-channel audio signal that is a facsimile of an input multi-channel audio signal, according to some embodiments.

FIG. 1 is a block diagram of an arrangement 10 of a simple audio encoder and simple audio decoder, intended to form a multi-channel audio signal 17 (7S) that is a facsimile of multi-channel audio signal 13 (Z). Multi-channel audio signal 13 is processed by simple audio encoder 14 to produce encoded representation 15, which may be stored 20 and/or transmitted 21 to simple audio decoder 16 which produces multi-channel audio signal 17. Preferably, the data size of encoded representation 15 is minimized whilst minimizing the difference between multi-channel audio signal 13 and multi-channel audio signal 17. Furthermore, the difference between multi-channel audio signal 13 and multi-channel audio signal 17 may be measured according to similarity as perceived by a human listener. The measure of human-perceived similarity between audio signal 13 and audio signal 17 is based on a reference playback method (that is, the assumed default means by which the audio channels of multi-channel audio signals 13, 17 are presented as an auditory experience to the listener).

The efficiency of simple audio encoder 14 and decoder 16 may be defined in terms of the data rate (measured in bits per second) of the encoded representation 15 required to provide multi-channel audio signal 17 that will be judged by a listener to match multi-channel audio signal 13 with a particular perceived quality level. Simple audio encoder 14 and decoder 16 may achieve greater efficiency (that is, a lower data rate) when the multi-channel audio signal 13 is known to possess particular attributes. In particular, greater efficiency may be achieved when it is known that multi-channel audio signal 13 possesses the following attributes (DD1 and DD2):

DD1: One or more channels of the multi-channel audio signal are generally more dominant than others, where a more dominant audio channel is one that will contain substantial elements of most (or all) of the sonic elements in the scene. That is, a dominant audio signal, when presented as a single audio channel to a listener, will contain most (or all) of the sonic elements of the multi-channel signal, when the multi-channel audio signal is presented to a listener through a reference playback method.

DD2: Each of the audio channels of the multi-channel audio signal is largely uncorrelated to each of the other audio channels Given the knowledge that multi-channel audio signal 13 possesses attributes DD1 and DD2, simple audio encoder 14 may achieve improved efficiency using several techniques including, but not limited to: allocating fewer bits to the encoding of less dominant channels or choosing to discard less dominant channels entirely. Simple audio encoder 14 may provide data to simple audio decoder 16 to assist in the regeneration of channels that were discarded by simple encoder audio encoder 14. Preferably, a multi-channel audio signal that does not possess attributes DD1 and DD2 may be processed by an encoder pre-mixer to form, e.g., to calculate, to determine, to construct or to generate, a multi-channel audio signal that does possess attributes DD1 and DD2, as described further in reference to FIG. 2. A corresponding decoder post-mixer may be applied to the simple decoder output to form an output multi-channel audio signal, such that the decoder post-mixer performs an approximate inverse operation relative to the operation of the encoder pre-mixer.

Figure 2:
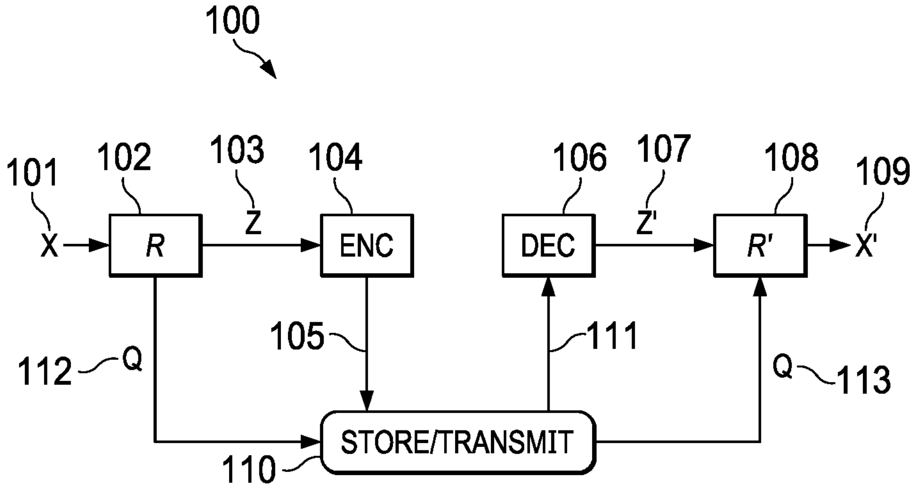
FIG. 2 is a block diagram of audio codec system that includes an audio encoder, audio decoder 106, encoder pre-mixer and decoder post-mixer, according to some embodiments.

FIG. 2 is a block diagram of audio codec system 100 that includes audio encoder 104 and audio decoder 106, encoder pre-mixer 102 and decoder post-mixer 108. Audio encoder 104 and audio decoder 106 form a multi-channel audio signal 109 (X') that is a facsimile of multi-channel audio signal 101 (X). Preferably, the data size of encoded representation 105 is minimized whilst minimizing the difference between multi-channel audio signal 101 and multi-channel audio signal 109. Furthermore, the difference between multi-channel audio signal 101 and multi-channel audio signal 109 may be measured according to similarity as perceived by a human listener.

The measure of human-perceived similarity between multi-channel audio signal 101 and multi-channel audio signal 109 is based on a reference playback method (that is, the assumed default means by which the audio channels of audio signals 101, 109 are presented as an auditory experience to the listener). The efficiency of multi-channel audio encoder 104 and multi-channel audio decoder 106 may be defined in terms of the data rate (measured in bits per second) of encoded representation 105 that provides a multi-channel audio signal 109 that will be judged by a listener to match multi-channel audio signal 101 with a particular perceived quality level.

Referring to FIG. 2, input multi-channel audio signal 101 is mixed according to encoder pre-mixer 102 (R) to produce output multi-channel audio signal 103 (Z) which is processed by simple audio encoder 104 to produce encoded representation 105, which may be stored 110 and/or transmitted 111 to simple audio decoder 106, which produces multi-channel audio signal 107 (Z'). Multi-channel audio signal 107 is processed by decoder post-mixer 108 (R') to produce decoded multi-channel audio signal 109. Encoder pre-mixer 102 provides metadata 112 (Q) that includes necessary information to determine a behavior of decoder post mixer 108. Metadata 112 may be stored and/or transmitted 110 with encoded representation 105. Measurement of the efficiency of multi-channel audio encoder 104 and multi-channel audio decoder 106 may include the size of the metadata 112 (commonly measured in bits per second), as will be appreciated by those skilled in the art.

Multi-channel audio signal 101 may be composed of N audio channels wherein significant correlations may exist between some pairs of channels, and wherein no single channel may be considered to be a dominant channel. That is, multi-channel audio signal 101 may not possess the attributes DD1 and DD2, and hence multi-channel audio signal 101 might not be a suitable signal for encoding and decoding using simple audio encoder 104 and decoder 106, respectively.

Preferably, encoder pre-mixer 102 is adapted to process input multi-channel audio signal 101 to produce output multi-channel audio signal 103, where output multi-channel audio signal 103 possesses attributes DD1 and DD2. Given input multi-channel audio signal X composed of N channels:

$$X(t) = \begin{pmatrix} X_1(t) \\ X_2(t) \\ \vdots \\ X_N(t) \end{pmatrix} \quad [1]$$

the output multi-channel audio signal Z is computed as $$Z(t) = \begin{pmatrix} Z_1(t) \\ Z_2(t) \\ \vdots \\ Z_N(t) \end{pmatrix} \quad [2]$$

$$= R(t) \times X(t). \quad [3]$$

The coefficients of encoder pre-mixer matrix R may vary over time, and R may thus be considered to be a function of time. The values of the elements of R may be computed at regular intervals (e.g., where the interval may be 20 ms, or a value between 1 ms and 100 ms) or at irregular intervals. When the values of the elements of R are changed, the change may be smoothly interpolated. In the following discussion, references to R should be treated as references to a time-varying encoder pre-mixer R(t) and references to R' should be treated as references to a time-varying decoder pre-mixer R'(t).

Figure 3:
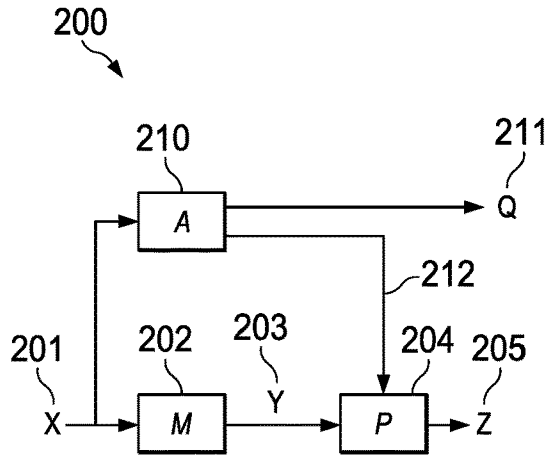
FIG. 3 illustrates an arrangement of processing elements whereby an input multi-channel audio signal is split by a filterbank into subband signals, where each subband is processed by a mixing matrix to produce a remixed subband signal, according to some embodiments.

In an embodiment, encoder pre-mixer 102 may make use of mixing coefficients, $R_b(t)$ for processing the components of the audio signals in a band b, where 1≤b≤B. FIG. 3 illustrates an arrangement of processing elements 150 whereby multi-channel audio signal 151 (X) is split by filterbank 152 into B sub-band signals, $X^{[1]}(t)$, $X^{[2]}(t)$, . . . $X^{[B]}(t)$, with each sub-band signal (for example 153 ($X^{[1]}(t)$)) is processed by a mixing matrix (for example 154 ($R_1$)) to produce a remixed subband signal (for example 155 ($Z^{[1]}(t)$)). Remixed sub-band signals, $Z^{[1]}(t)$, $Z^{[2]}(t)$, . . . $Z^{[B]}(t)$, are recombined by combiner 156 to form multi-channel audio signal 157 (Z).

For the purpose of the following discussion, references to the matrix R(t) may be interpreted as references to $R_b(t)$, where b refers to a subband. It will be appreciated that the discussion that follows may be applied to signals that are processed in subbands, or to signals that are processed without subband treatment. It will be appreciated by those skilled in the art that many methods may be used to process audio signals according to sub-bands, and the discussion of the matrix R will apply to those methods.

Referring to FIG. 2, R mixes the channels of multi-channel audio signal 101 to produce multi-channel audio signal 103 that possesses the attributes, DD1 and DD2, as described above, thus enabling encoder 104 to achieve improved data efficiency. Decoder post-mixer 108 (R') provides a mixing operation that is the inverse of mixer R, such that.

$$X'(t)=R'(t)\times Z'(t) \quad [4]$$

Figure 4:
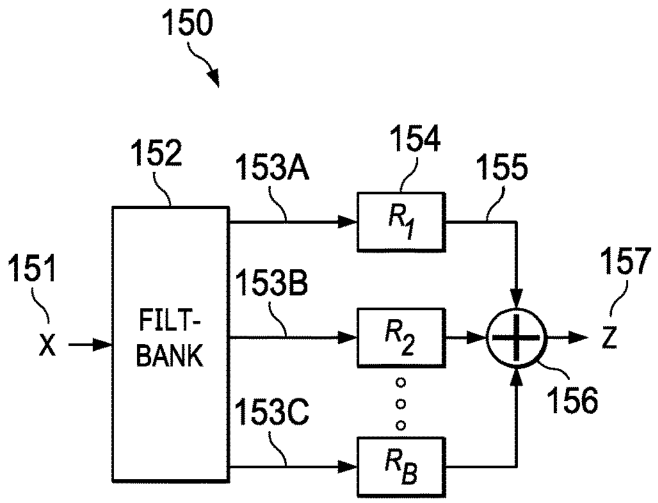
FIG. 4 is a block diagram of an arrangement of two mixing operations intended to implement the function of the encoder pre-mixer of FIG. 2 or the encoder pre-mixer of FIG. 3, according to some embodiments.

FIG. 3 is a block diagram of an arrangement 200 of two mixing operations intended to implement the function of encoder pre-mixer 102 (R) of FIG. 2 or encoder premixer $R_b$ of FIG. 4 N-channel multi-channel input signal 201 (X) is mixed by mixing matrix 202 (M) to produce the N-channel intermediate signal 203 (Y), which is then processed by mixer 204 (P to produce the N-channel signal 205 (Z). The signals 201 (X) and 205 (Z) in FIG. 3 are intended to correspond respectively with input signal 101(1) and 103 (Z) in FIG. 2, or to sub-band signals 153 ($X_b$(t)) and 155 ($Z_b$(t)) in FIG. 4.

Analysis block 210 (A) takes input from signal 201, and computes the coefficients 212 to be used to adapt the operation of the mixer 204. Analysis block 210 also produces the metadata 211 (Q), corresponding to the metadata 112 of FIG. 2, which will be provided to the decoder, as 113 (Q), to be used by decoder post-mixer 108.

It will be appreciated from the arrangement of the mixers 202 and 204 in FIG. 3, that the matrix R will be:

$$R(t)=P(t)\times M \quad [5]$$

wherein the matrix P(t) may vary with time.

Hence:

$$\begin{aligned} Y(t) &= M\times X(t) \\ Z(t) &= P(t)\times Y(t) \\ &= P(t)\times M\times X(t) \\ &= R(t)\times X(t) \end{aligned} \quad [6]-[9]$$

The matrix M is adapted to ensure that the intermediate signal 203 (Y) possesses attribute DD1. That is the N-channel signal 203 (Y) contains one channel that may be considered to be a dominant channel. Without loss of generality, the matrix M is adapted to ensure that the first channel, $Y_1(t)$ is a dominant channel. Hereinafter, when the first channel of a multi-channel signal is a dominant channel, this first channel will be referred to as a primary channel. The primary channel may also be referred to as an "eigen channel" in some contexts.

The [N×N] matrix M may be determined from the [N×N] expected covariance matrix Cov of the N-channel input signal, X(t):

$$Cov = E\left(X(t)\times X(t)^H\right) \quad [10]-[11]$$

$$= \begin{pmatrix} E\left(X_1(t)\overline{X_1(t)}\right) & E\left(X_1(t)\overline{X_2(t)}\right) & \cdots & E\left(X_1(t)\overline{X_N(t)}\right) \\ E\left(X_2(t)\overline{X_1(t)}\right) & E\left(X_2(t)\overline{X_2(t)}\right) & \cdots & E\left(X_2(t)\overline{X_N(t)}\right) \\ \vdots & \vdots & \ddots & \vdots \\ E\left(X_N(t)\overline{X_1(t)}\right) & E\left(X_N(t)\overline{X_2(t)}\right) & \cdots & E\left(X_N(t)\overline{X_N(t)}\right) \end{pmatrix}$$

$$Cov = E\left(X(t)\times X(t)^H\right)$$

-continued $$= \begin{pmatrix} E\left(X_1(t)\overline{X_1(t)}\right) & E\left(X_1(t)\overline{X_2(t)}\right) & \cdots & E\left(X_1(t)\overline{X_N(t)}\right) \\ E\left(X_2(t)\overline{X_1(t)}\right) & E\left(X_2(t)\overline{X_2(t)}\right) & \cdots & E\left(X_2(t)\overline{X_N(t)}\right) \\ \vdots & \vdots & \ddots & \vdots \\ E\left(X_N(t)\overline{X_1(t)}\right) & E\left(X_N(t)\overline{X_2(t)}\right) & \cdots & E\left(X_N(t)\overline{X_N(t)}\right) \end{pmatrix}$$

where the $X(t)^H$ operation indicates the Hermitian Transpose of the N-length column vector X(t), and the E( ) operation indicates the expected value of a variable quantity.

The expected values, as used in Equation [10], may be estimated based on the assumed characteristics of typical input multi-channel audio signals, or they may be estimated by statistical analysis of a set of typical input multi-channel audio signals.

The covariance matrix, Cov, may be factored according to eigen-analysis, as will be familiar to those skilled in the art:

$$Cov=V\times D\times V^H \quad [12]$$

where the matrix V is a unitary matrix and the matrix D is a diagonal matrix with the diagonal elements being non-negative real values sorted in descending order.

The matrix M may be chosen to be:

$$M=V^H \quad [13]$$

It will be appreciated by those skilled in the art that the covariance matrix, Cov, will be dependent on the panning methods used to form the original input signal X(t), as well as the typical use of the panning methods as used by the creators of typical signals.

By way of example, when the original input signal is a 2-channel stereo signal intended for playback on stereo speakers, the typical panning rules used by content creators will result in some audio objects being panned to the first channel (in this context, this is often referred to as the Left channel), some audio objects being panned to the second channel (in this context, this is often referred to as the Right channel), and some objects being panned simultaneously to both channels. In this case, the covariance matrix may be similar to:

$$\text{for } L/R \text{ stereo: } Cov = \begin{pmatrix} 1.0 & 0.5 \\ 0.5 & 1.0 \end{pmatrix} \quad [14]$$

and according to Equations [12] and [13]:

$$\text{for } L/R \text{ stereo: } M = \begin{pmatrix} \frac{1}{\sqrt{2}} & \frac{1}{\sqrt{2}} \\ \frac{1}{\sqrt{2}} & -\frac{1}{\sqrt{2}} \end{pmatrix} \quad [15]$$

The matrix M in Equation [15] will be familiar to those skilled in the art as a mixing matrix suitable for converting the original input audio signal Xin L/R stereo format to an intermediate signal Z that will be in Mid/Side format. It will also be appreciated by those skilled in the art that the first channel of Z (often referred to as the Mid signal in this case) is a dominant audio signal (the primary channel), having the property that most audio elements in a stereo mix will be present in the Mid signal.

By way of an alternative example, when the original input signal is a 5-channel surround signal intended for playback on a common arrangement of five speakers, the typical panning rules used by content creators will result in some audio objects being panned to the one of the five channels, and some objects being panned simultaneously to two or more channels. In this case, the covariance matrix may be similar to:

$$\text{for 5-channels: } Cov = \begin{pmatrix} 1.500 & 0.595 & 1.155 & 1.155 & 0.595 \\ 0.595 & 1.500 & 1.155 & 0.595 & 1.155 \\ 1.155 & 1.155 & 1.500 & 0.595 & 0.595 \\ 1.155 & 0.595 & 0.595 & 1.500 & 1.155 \\ 0.595 & 1.155 & 0.595 & 1.155 & 1.500 \end{pmatrix}. \quad [16]$$

and according to equations [12] and [13]:

$$\text{for 5-channels: } M = \begin{pmatrix} 0.447 & 0.447 & 0.447 & 0.447 & 0.447 \\ -0.195 & -0.195 & -0.632 & 0.512 & 0.512 \\ 0.602 & -0.602 & 0.000 & 0.372 & -0.372 \\ -0.512 & -0.512 & 0.632 & 0.195 & 0.195 \\ -0.372 & 0.372 & 0.000 & 0.602 & -0.602 \end{pmatrix}. \quad [17]$$

It will be appreciated that the top row of matrix M of Equation [17] is made up of similar (or identical) positive values. This means that, according to Equation [6], the first channel of the intermediate signal Y(t) will be formed by the sum of the five channels of the original input audio signal, X(t), and this ensures that all sonic elements that are panned in the original input audio signal will be present in $Y_1(t)$ (the first channel of the N-channel signal Y(t)). Hence, this choice of the matrix M ensures that the intermediate signal Y possesses the attribute DD1 ($Y_1(t)$ is a primary channel).

In a further alternative example, when the input multi-channel audio signal, X(t), already contains a dominant channel (and, without loss of generality, it is assumed the first channel, $X_1(t)$ is dominant), the matrix M may be an [N×N] identity matrix. In a more specific example of an input multi-channel audio signal with a dominant/primary first channel, the input multi-channel audio signal may represent an acoustic scene encoded in an Ambisonic format (a means for encoding acoustic scenes that will be familiar to those skilled in the art).

The matrix 212 (P(t)) is computed by the analysis block 210 (A) in FIG. 3, at time t, according to the following process.

1. Determine the covariance of the intermediate signal Y(t) at time t. An example of a method for computing the covariance is.

$$Cov_Y(t) = \frac{1}{T}\int_{t-T/2}^{t+T/2} Y(t) \times Y(t)^H \quad [18]$$

Alternatively, the covariance of the intermediate signal Y(t) may be computed from the covariance of the input multi-channel audio signal X(t), as:

$$Cov_Y(t) = M \times CoV_X(t) \times M^H \quad [19]$$

where $$Cov_X(t) = \frac{1}{T}\int_{t-T/2}^{t+T/2} X(t) \times X(t)^H. \quad [20]$$

2. From the [L×L] covariance matrix, $Cov_Y(t)$, extract the scalar quantity $w=[Cov_Y(t)]_{1,1}$, the [N×1] column vector $v=[Cov_Y(t)]_{2.L,1}$, and the [N×N] matrix $E==[Cov_Y(t)]_{2 \ldots L, 2 \ldots L}$, where N=L−1, and:

$$Cov_Y(i) = \begin{pmatrix} w & v^H \\ v & E \end{pmatrix}. \quad [21]$$

3. Determine the quantities α, β and the [N×1] vector of mixing coefficients u:

$$\alpha = |v|_2 = \sqrt{\sum_{n=1}^{N} v_n^2} \quad [22]$$

$$u = \frac{1}{\alpha} v \quad [23]$$

$$\beta = u^H \times E \times u \quad [24]$$

4. Given the quantities w, α and β, solve Equation [25], to determine the input mixture strength coefficient h and the prediction mixture strength coefficient g:

$$\beta h^2 g + 2\alpha h g - \beta h - \alpha + g w = 0 \quad [25]$$

where the solutions to this equation will also satisfy a pre-prediction constraint equation. One example of a pre-prediction constraint equation is:

$$PPC1: h = fg, \quad [26]$$

where f is a pre-determined constant value satisfying 0<f≤1.

When the pre-prediction constraint PPC1 is used, Equation [25] can be modified to be:

$$\beta f^2 g^3 + 2\alpha f g^2 - \beta f g - \alpha + g w = 0 \quad [27]$$

and Equation [27] can be solved for the largest real value of g, and hence the value of h may be determined using Equation [26].

5. Form the [L×L] matrix Q as:

$$Q = \begin{pmatrix} 0 & 0 \cdots 0 \\ & 0 \;\cdots\; 0 \\ u & \vdots \quad\;\; \vdots \\ & 0 \;\cdots\; 0 \end{pmatrix}. \quad [28]$$

6. Form the [L×L] matrix P(t) as:

$$P(t) = (I_L - gQ) x (I_L + hQ^H) \quad [29]$$

where $I_L$ is the [L×L] identity matrix.

The metadata 211 (Q) in FIG. 3 may convey information that will allow the unit-vector u and the coefficients g and h to be determined by the decoder post-mixer 113 of FIG.

The solution for g of Equation [27] may be approximated by choosing an initial estimate $g_1=1$ and iterating (according to Newton's method, as is known in the art) a number of times:

$$g_{k+1} = g_k - \frac{f^2 g_k^3 + 2\alpha f g_k^2 - \beta f g_k - \alpha + g_k w}{3 f^2 g_k^2 + 4\alpha f g_k - \beta f + w}, \quad [30]$$

such that a reasonable approximation for the solution may be found from $g=g_5$. It will be appreciated that other methods are known in the art for finding approximate solutions to the cubic Equation [27].

According to an alternative embodiment, the [L×L] matrix P(t) may be determined, at time t, by determining a [N×1] vector u indicative of the correlation between the primary channel of the intermediate signal Y(t) and the remaining N non-primary channels, and determining the input mixture strength coefficient h and the prediction mixture strength coefficient g to form P(t) according to Equation [28], such that the signal Z(t)=P(t)×Y(t) will possess the attributes DD1 and DD2.

The determination of coefficients g and h may be governed by a pre-prediction constraint equation. An example of a pre-prediction constraint equation is given (PPC1) in Equation [26]. A preferred choice for the coefficient f may be f=0.5, but values of f in the range 0.2≤f≤1 may be appropriate for use.

In an alternative embodiment, the following pre-prediction constraints may be used:

$$PPC2: g = \begin{cases} \frac{\alpha}{w} & \text{when: } \frac{\alpha}{w} < c \\ c & \text{otherwise} \end{cases} \quad [31]$$

where c is a pre-determined constant. A typical value may be c=1, but values of c may be chosen in the range 0.25≤c≤4.

According to the constraint PPC2 in Equation [31], the solution to Equation [25] is:

$$\text{when: } \frac{\alpha}{w} < c \quad \begin{matrix} g = \frac{\alpha}{w} \\ h = 0 \end{matrix} \quad [32]\text{–}[33]$$

$$\text{otherwise: } \quad \begin{matrix} g = c \\ h = \frac{\beta - 2c\alpha + \sqrt{\beta^2 + 4\alpha^2c^2 - 4c^2\beta w}}{2c\beta} \end{matrix} . \quad [34]\text{–}[35]$$

Figure 5:
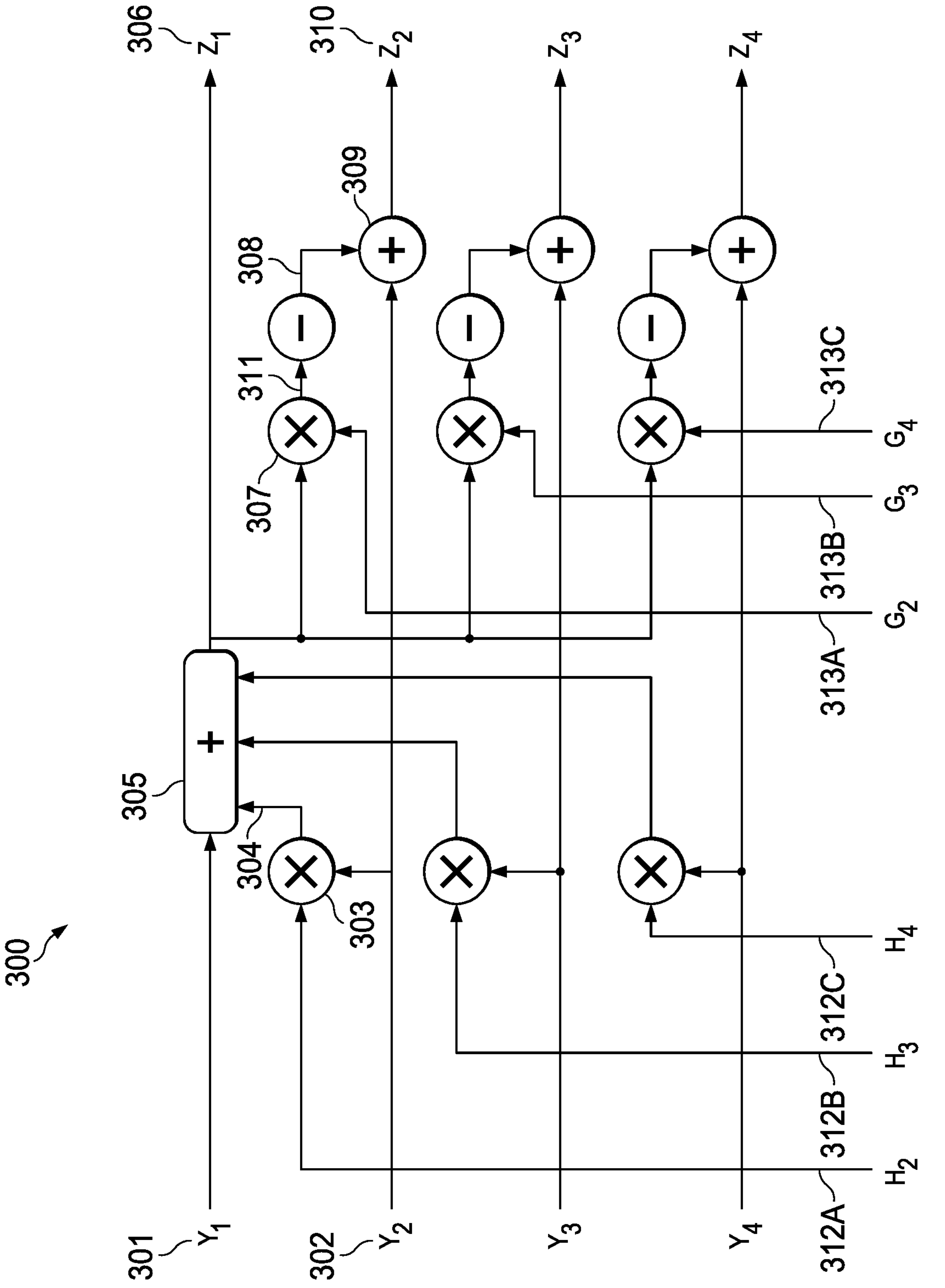
FIG. 5 is a block diagram of a prediction mixer, according to some embodiments.

FIG. 5 is a block diagram of a prediction mixer 300, according to some embodiments. The matrix terms, ($I_L$− gQ) and ($I_L$+h$Q^H$) of Equation [29] may be implemented by prediction mixer 300, wherein, in this example, the signal Y(t) is composed of 4 channels (L=4), the first channel 301 ($Y_1$) is a primary channel and the remaining 3 non-primary channels 302 (e.g., $Y_2$, $Y_3$, $Y_4$) are scaled according to the three input gains 312 ($H_2$, $H_3$ and $H_4$) to form the scaled input signal components (e.g., 304). The scaled input signal components are summed 305 with the primary input channel 301 ($Y_1$) to form the primary output 306 ($Z_1$). Primary output 306 ($Z_1$) is scaled by the three prediction gains 313 ($G_2$, $G_3$ and $G_4$) to form three prediction signals (e.g., 311). Each prediction signal is subtracted (e.g. 308 and 309) from the respective input (e.g., $Y_2$ 302) to form the respective non-dominant output 310 ($Z_2$).

The three input gains 312 ($H_2$, $H_3$ and $H_4$) may be determined from the mixing coefficients u (determined as per Equation [23]) and the input mixture strength coefficient h (as per the solution to Equation [25]), where:

$$\begin{pmatrix} H_2 \\ H_3 \\ H_4 \end{pmatrix} = hu. \quad [36]$$

The three prediction gains 313 ($G_2$, $G_3$ and $G_4$) may be determined from the mixing coefficients u (determined as per Equation [23]) and the prediction mixture strength coefficient g (as per the solution to Equation [25]), where:

$$\begin{pmatrix} G_2 \\ G_3 \\ G_4 \end{pmatrix} = gu. \quad [37]$$

It will be appreciated, by those skilled in the art, that the arrangement of linear matrix operations M202 and P204 of FIG. 3 may be implemented using a single matrix R=P×M.

It will be appreciated, by those skilled in the art, that the decoder matrix R' of FIG. 2 may be formed from the matrices M', the inverse of M) and P' (the inverse of P):

$$R'(t)=M'\times P'(t), \quad [38]$$

and M' may be pre-computed (not varying as a function of time) and P' may be formed by the method:

$$P'=(I_L\text{-}hQ^H)x(I_L+9Q) \quad [39]$$

Figure 6:
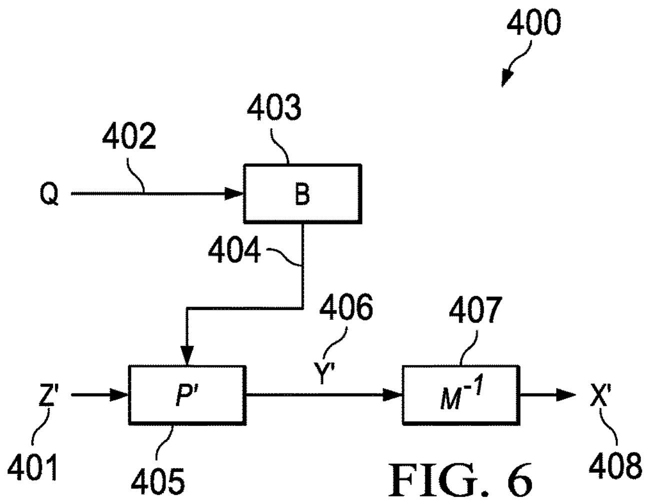
FIG. 6 shows an arrangement of processing elements that implement the decoder post-mixer of FIG. 2, according to some embodiments.

FIG. 6 shows an arrangement 400 of processing elements that implement a decoder post-mixer. 108 in FIG. 2. The metadata 402 (Q) provides information to the inverse-prediction determination block 403 (B) which computes the coefficients 404 necessary to determine the operation of inverse-predictor 405 (R'). The signal 401 (Z') is processed by inverse-predictor 405 (P') to produce the intermediate signal 406 (Y'), which is then processed by matrix 407 (M') to produce the output signal 408 X'.

Example Process

Figure 7:
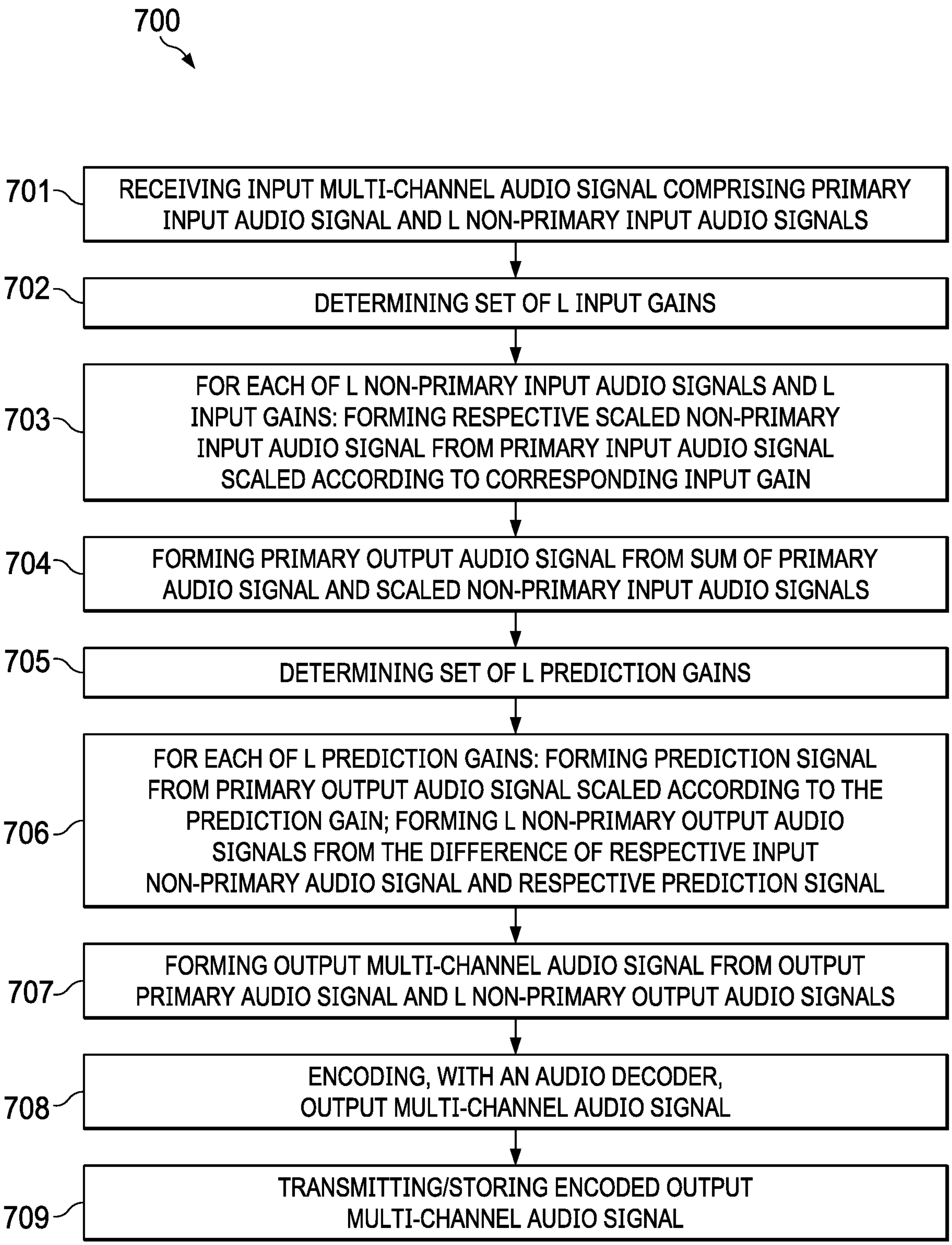
FIG. 7 is a flow diagram of a process of adaptive downmixing of audio signals with improved continuity, according to some embodiments.

FIG. 7 is a flow diagram of a process 700 of adaptive downmixing of audio signals with improved continuity, according to some embodiments. Process 700 can be implemented by, for example, system 800 shown in FIG. 8.

Process 700 includes the steps of: receiving an input multi-channel audio signal comprising a primary input audio channel and L non-primary input audio channels (701); determining a set of L input gains, where L is a positive integer greater than one (702); for each of the L non-primary input audio channels and L input gains, forming a respective scaled nonprimary input audio channel from the respective non-primary input audio channel scaled according to the input gain (703); forming a primary output audio channel from the sum of the primary input audio channel and the scaled non-primary input audio channels (704); determining a set of L prediction gains for each of the L prediction gains (705); forming a prediction channel from the primary output audio channel scaled according to the prediction gain, and forming L non-primary output audio channels from the difference of the respective non-primary input audio channel and the respective prediction signal (706); forming an output multi-channel audio signal from the primary output audio channel and the L non-primary output audio channels (707); encoding the output multi-channel audio signal (708); and transmitting or storing the encoded output multi-channel audio signal (709). Each of these steps are described more fully in reference to FIGS. 1-6.

Example System Architecture

Figure 8:
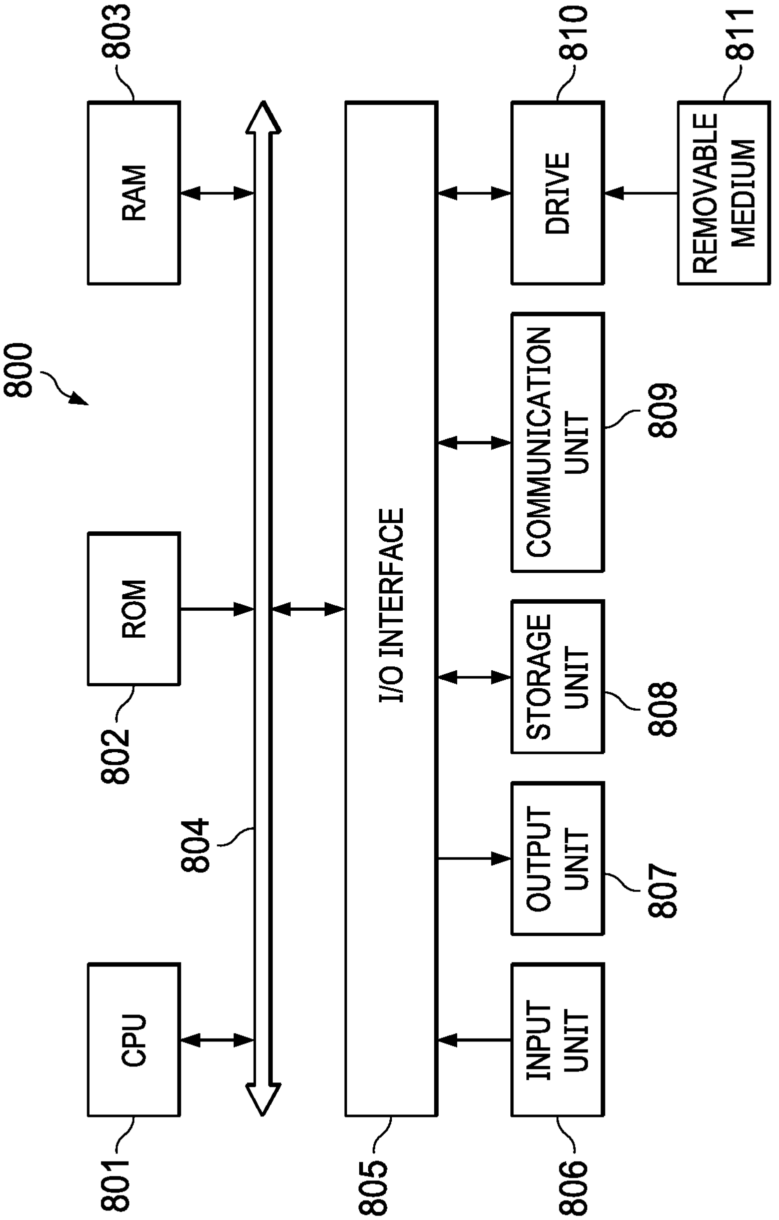
FIG. 8 is a block diagram of a system for implementing the features and processes described in reference to FIGS. 1-7, according to some embodiments.

FIG. 8 shows a block diagram of an example system 800 for implementing the features and processes described in reference to FIGS. 1-7, according to an embodiment. System 800 includes any devices that are capable of playing audio, including but not limited to: smart phones, tablet computers, wearable computers, vehicle computers, game consoles, surround systems, kiosks.

As shown, the system 800 includes a central processing unit (CPU) 801 which is capable of performing various processes in accordance with a program stored in, for example, a read only memory (ROM) 802 or a program loaded from, for example, a storage unit 808 to a random-access memory (RAM) 803. In the RAM 803, the data required when the CPU 801 performs the various processes is also stored, as required. The CPU 801, the ROM 802 and the RAM 803 are connected to one another via a bus 804. An input/output (I/O) interface 805 is also connected to the bus 804.

The following components are connected to the I/O interface 805: an input unit 806, that may include a keyboard, a mouse, or the like; an output unit 807 that may include a display such as a liquid crystal display (LCD) and one or more speakers; the storage unit 808 including a hard disk, or another suitable storage device; and a communication unit 809 including a network interface card such as a network card (e.g., wired or wireless).

In some implementations, the input unit 806 includes one or more microphones in different positions (depending on the host device) enabling capture of audio signals in various formats (e.g., mono, stereo, spatial, immersive, and other suitable formats).

In some implementations, the output unit 807 include systems with various number of speakers. As illustrated in FIG. 8, the output unit 807 (depending on the capabilities of the host device) can render audio signals in various formats (e.g., mono, stereo, immersive, binaural, and other suitable formats).

The communication unit 809 is configured to communicate with other devices (e.g., via a network). A drive 810 is also connected to the I/O interface 805, as required. A removable medium 811, such as a magnetic disk, an optical disk, a magneto-optical disk, a flash drive or another suitable removable medium is mounted on the drive 810, so that a computer program read therefrom is installed into the storage unit 808, as required. A person skilled in the art would understand that although the system 800 is described as including the above-described components, in real applications, it is possible to add, remove, and/or replace some of these components and all these modifications or alteration all fall within the scope of the present disclosure.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 811, as shown in FIG. 8.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 8), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An audio encoding method comprising:

receiving, with at least one processor, an input multi-channel audio signal comprising a primary input audio channel and L non-primary input audio channels;

determining, with the at least one processor, a set of L input gains, wherein L is a positive integer greater than one, and wherein the set of L input gains are determined by scaling a set of L mixing coefficients by an input mixture strength coefficient;

for each of the L non-primary input audio channels and L input gains, forming a respective scaled non-primary input audio channel from the respective non-primary input audio channel scaled according to the input gain;

forming a primary output audio channel from a sum of the primary input audio channel and the scaled non-primary input audio channels;

determining, with the at least one processor, a set of L prediction gains, wherein the set of L prediction gains is determined by scaling the set of L mixing coefficients by a prediction mixture strength coefficient;

for each of the L prediction gains, forming, with the at least one processor, a prediction channel from the primary output audio channel scaled according to the prediction gain;

forming, with the at least one processor, L non-primary output audio channels from a difference of the respective non-primary input audio channel and the respective prediction channel;

forming, with the at least one processor, an output multi-channel audio signal from the primary output audio channel and the L non-primary output audio channels;

encoding, with an audio encoder, the output multi-channel audio signal; and transmitting or storing, with the at least one processor, the encoded output multi-channel audio signal.

2. A non-transitory computer-readable medium storing instructions that, when executed by one or more computer processors, cause the one or more computer processors to perform operations of claim 1.

* * * * *